United States Patent
Dobie et al.

(10) Patent No.: US 12,016,107 B2
(45) Date of Patent: Jun. 18, 2024

(54) CONTINUOUS MODE CONVEYOR COOKING UTILIZING HOT AIR JET IMPINGEMENT AND MICROWAVE ENERGY

(71) Applicant: Texas Research International, Inc, Austin, TX (US)

(72) Inventors: Michael Jay Dobie, Double Oak, TX (US); Anthony Patti, Wakefield, MA (US); Robert Philip Brushaber, Austin, TX (US); Frank Thomas Zeller, Dripping Springs, TX (US); Neal S. Cooper, N. Richland Hills, TX (US)

(73) Assignees: TEXAS RESEARCH INTERNATIONAL, INC., Austin, TX (US); US GOVERNMENT AS REPRESENTED BY THE SECRETARY OF THE ARMY, Natick, MA (US)

(*) Notice: Subject to any disclaimer, the term of this patent is extended or adjusted under 35 U.S.C. 154(b) by 380 days.

(21) Appl. No.: 17/207,532

(22) Filed: Mar. 19, 2021

(65) Prior Publication Data

US 2021/0298137 A1   Sep. 23, 2021

Related U.S. Application Data

(60) Provisional application No. 62/991,926, filed on Mar. 19, 2020.

(51) Int. Cl.
*H05B 6/64* (2006.01)
*A21B 1/24* (2006.01)
(Continued)

(52) U.S. Cl.
CPC ............ *H05B 6/647* (2013.01); *A21B 1/245* (2013.01); *A23L 5/15* (2016.08); *A47J 37/045* (2013.01);
(Continued)

(58) Field of Classification Search
CPC ...................................... A21B 1/245
See application file for complete search history.

(56) References Cited

U.S. PATENT DOCUMENTS 3,802,832 A * 4/1974 Nicolaus ............... A47J 37/044
432/128
4,409,453 A 10/1983 Smith
(Continued)

FOREIGN PATENT DOCUMENTS

| JP | H0743996 Y2 * 10/1995 | |
| KR | 20160135867 A * 11/2016 | |
| WO | WO-2009030778 A1 * 3/2009 | ............... H01P 1/16 |

OTHER PUBLICATIONS

WO-2009030778-A1 (Kriszio, Horst) Mar. 12, 2009 [retrieved on Jan. 25, 2024]. Retrieved from Espacenet Database, translation by EPO and Google. (Year: 2009).*

*Primary Examiner* — John J Norton
*Assistant Examiner* — Franklin Jefferson Wang
(74) *Attorney, Agent, or Firm* — Jackson Walker LLP (57) ABSTRACT

A continuous mode conveyor cooking appliance utilizing hot air jet impingement and microwave energy for cooking prepared foods. The approach envisions a central microwave unit with a hot air jet impingement oven unit on each side of the microwave section and a conveyor system to carry the food items completely through the appliance from one end to the other and with the two hot air jet impingement ovens equipped with a designed combination of hot air jet impingement jets and solid pins to act as a microwave (Continued)

attenuation system to reduce microwave exposure to cooking personnel to completely safe levels.

8 Claims, 11 Drawing Sheets (51) Int. Cl.
*A23L 5/10* (2016.01)
*A47J 37/04* (2006.01)
*H05B 6/70* (2006.01)
*H05B 6/76* (2006.01)
*H05B 6/78* (2006.01)

(52) U.S. Cl.
CPC ............... *H05B 6/707* (2013.01); *H05B 6/76* (2013.01); *H05B 6/763* (2013.01); *H05B 6/782* (2013.01)

(56) References Cited

U.S. PATENT DOCUMENTS

| | | | |
|---|---|---|---|
| 4,492,839 A * | 1/1985 | Smith | A23L 5/17 |
| | | | 219/699 |
| 5,254,823 A | 10/1993 | McKee et al. | |
| 5,539,187 A | 7/1996 | Smith et al. | |
| 5,560,952 A | 10/1996 | Miller | |
| 5,818,014 A | 10/1998 | Smith et al. | |
| 5,958,274 A | 9/1999 | Dobie | |
| 6,250,296 B1 | 6/2001 | Norris et al. | |
| 6,369,360 B1 | 4/2002 | Cook | |
| 6,927,372 B2 | 8/2005 | Ekinge et al. | |
| 7,087,872 B1 | 8/2006 | Dobie et al. | |
| 8,093,538 B2 | 1/2012 | Claesson et al. | |
| 8,455,797 B2 | 6/2013 | McKee et al. | |
| 2005/0236387 A1* | 10/2005 | Stockley | F24C 15/18 |
| | | | 219/394 |
| 2008/0216812 A1 | 9/2008 | Dougherty | |
| 2010/0119659 A1* | 5/2010 | Ovadia | H05B 6/6473 |
| | | | 426/243 |
| 2016/0025350 A1* | 1/2016 | Goble | F24C 7/06 |
| | | | 99/331 |
| 2017/0099986 A1 | 4/2017 | Patel et al. | |
| 2019/0075826 A1* | 3/2019 | Mohammed | A23L 3/045 |
| 2020/0060290 A1* | 2/2020 | Schjerven, Sr | A21B 1/48 |
| 2020/0187510 A1* | 6/2020 | Wolfe | A21B 3/07 |

* cited by examiner

CONTINUOUS MODE CONVEYOR COOKING UTILIZING HOT AIR JET IMPINGEMENT AND MICROWAVE ENERGY

CROSS-REFERENCE TO RELATED APPLICATIONS

This application claims the benefit of U.S. Provisional application 62/991,926 filed Mar. 19, 2020. The aforementioned patent application is hereby incorporated by reference in its entirety into the present application to the extent consistent with the present application.

This invention was made with government support under the Small Business Innovative Research (SBIR) Program, Topic Number A16-061 contract number W911QY-17-C-0091 awarded by the U.S. Army Natick Soldier RD&E Center. The government has certain rights in the invention.

FIELD

This application relates to a need for high-speed cooking conveyor appliances utilizing both hot air impingement and microwave energy in open ended conveyor systems that do not expose cooking personnel to excessive heat, noise, and microwave energy.

BACKGROUND

There are market needs for compact high-speed conveyor cooking appliances for rapid and large volume cooking of certain foods. An example of this is feeding mobile armies in modern warfare. Military field kitchens are required to provide high volume throughput while maintaining the best quality of group feeding rations for warfighters. This is done with a designed group ration called a Unitized Group Ration.

The Unitized Group Ration—A Option (UGR-A) is used to sustain military personnel during worldwide operations that allow organized food service facilities. The UGR-A is designed to maximize the use of commercial items and to simplify the process of providing high quality food service in a field environment. Ail components fora complete 50-person meal are included in the UGR-A, with the exception of mandatory supplements, such as milk and cold cereal, and optional enhancements like bread and fresh fruit and vegetables. The UGR-A includes perishable/frozen type entrees (A-Rations) along with commercial-type components. Currently there are 7 breakfast and 14 lunch/dinner menus available.

The Army's highest quality group feeding operational ration in use today is the Unitized Group Ration, A (UGR-A). This ration uses frozen entrees that are tempered and prepared on custom military griddles, skillets, stock pots, and ovens. The Army needs one appliance designed to military standards that is capable of operation from multiple power sources. This appliance needs to have the highest volume throughput possible while reducing the required fuel and water to operate the appliance.

It is also desirable that the proposed high speed cooking conveyor appliance can handle (UGR-M) rations as well as UGR-H&S rations (Heat and Serve).

Hot air impingement and microwave radiation are two different means for heating and cooking a food product based on different physical principles. Hot air impingement is based on the transfer of heat from a hot air having a higher temperature to an object having a lower temperature, changing the internal energy of the air and the object in accordance with the first law of thermodynamics. On the other hand, microwave radiation consists of electromagnetic waves having a typical wavelength of 12.24 cm or 4.82 inches and a frequency of 2,450 MHz, which are capable of causing dielectric heating of water, fat and sugar molecules in a food product.

One of the most advanced and cost-effective way to obtain high rates of heat transfer in many applications is the air jet impingement oven. In the simplest form, an air jet impingement oven has a fan to circulate the air just as the forced convection oven does. But instead of moving heated air in random paths as in the forced convection processes, the impingement oven directs high velocity jets (500 to 8000 fpm) of hot air at the food. These air columns are carefully arranged to strike the food at right angles from above and below. The columns push heat through the cold air boundary layer surrounding the food, rapidly transferring heat to the product surfaces. As with other ovens, heat at the surface of the product must then be conducted to the middle of the rations being heated.

Microwave heating generally occurs below the surface of the product. Combining it with air jet impingement may make the ideal heating technique for the Army UGR-A. The combination oven places the heating energy exactly where it is required: impingement on the surface; microwave to the interior. Each energy source delivers precise amounts of heat to the product where and when required.

Initially, ovens based on hot air impingement and microwave ovens were separately developed and commercialized. However, it was later demonstrated that a combination of hot air impingement and microwave radiation used in an oven can facilitate high-speed, high-quality cooking. See, for example, U.S. Pat. No. 5,254,823 to McKee et al., U.S. Pat. No. 5,434,390 to McKee et al., U.S. Pat. No. 5,558,793 to McKee et al., and U.S. Pat. No. 6,060,701 to McKee et al. This led to the development and commercialization of quick-cooking hybrid ovens based on both hot air impingement and microwave radiation and has established a new standard in the high-speed cooking technology.

Most of these approaches are focused on batch ovens however, and to achieve the high-speed requirements of applications such as needed in field military operations it is desired to accomplish the cooking in a continuous manner utilizing something like conveyor systems so that the rations can be continuously fed through the ovens and removed out the other end for serving. In addition, the ovens need to be compact enough in size and weight to be able to transport and set up in the field.

These requirements must be balanced by a requirement to reduce cooking personnel to excessive heat, noise, and microwave exposure.

It is desired therefore to develop an open ended high speed cooking conveyor appliance that combines high heat transfer hot air jets impingement ovens, with center microwave section, to allow continuous input of prepared foods in one end of the conveyors and to produce high volume throughput, high quality food exiting the other end of the conveyors. This development is the application of new and existing technologies into one specific unique package and use application.

Such a system has the potential to be used in other military and commercial kitchens that feed large groups of people. There is a market potential for this equipment in cafeterias and large catering events such as sports arenas.

Microwave energy is used in many food preparation, industrial, scientific and medical applications, which frequently require the participation of human beings in direct contact with microwave equipment. Specifically, microwave ovens often employ open-ended waveguide ports in order to allow a continuous flow of the material to be processed. For this reason, safety issues become a main concern in such systems to prevent possible dangerous effects on human tissues due to microwave energy leakage.

Some alternatives to deal with this leakage problem have been proposed in technical literature. One of the most effective choices is based on corrugated reactive filters which reflect back the energy escaping from the applicator. But some limitations have been found in this work for those traditional structures, particularly regarding the dielectric properties of the processed material.

In the proposed compact high-speed conveyor cooking appliance utilizing both hot air impingement and microwave energy proposed in this disclosure the microwave attenuation issue is addressed by a combination of a center microwave chamber surrounded on two sides by hot air impingement chambers in which a combination of hot air impingement jets intermixed with solid pins designed to act as a microwave attenuation system. The three conveyor belts that move the food portions through the cooking appliance passes through a first hot air impingement chamber, then the center microwave chamber, and then out the second hot air impingement chamber.

BRIEF SUMMARY

A continuous mode conveyor cooking appliance utilizing hot air jet impingement and microwave energy for cooking prepared foods, including at least: a housing comprising a central microwave section, a first end portion, and a second end portion on either side of the microwave section; a food insert entrance portion defined within the first end portion of said housing for inputting food, to be cooked, into said housing; a food extraction exit portion defined within a second opposite end portion of said housing for extracting food, that has been cooked, out from said housing; an upper endless conveyor belt and a lower endless conveyor belt disposed within said housing and cooperating with each other for propelling the food, to be cooked, from said food insert entrance portion of said housing to said food extraction exit portion of said housing; wherein said first end portion and said second end portion comprise hot air impingement jets for heating and solid pins, the combination of which are configured to function as a microwave energy attenuation system to control microwave energy leakage from said first end portion and said second end portions.

DETAILED DESCRIPTION

The solution described herein and now tested is a reliable, continuous mode conveyor cooking system that prepares military UGR-A rations that would eliminate the need for an entire kitchen ensemble. The combination of high heat transfer of hot air impingement and microwave energy has the potential to produce high volume rapid throughput results with the best quality. This method of cooking currently exists in commercial restaurants in a batch mode as a way to rapidly prepare high quality meals to order. This cooking technology has the potential to be used in a continuous mode process that combines both microwave and hot air impingement technologies into one unit to address the higher production capacity needs for military field feeding operations.

Figure 1:
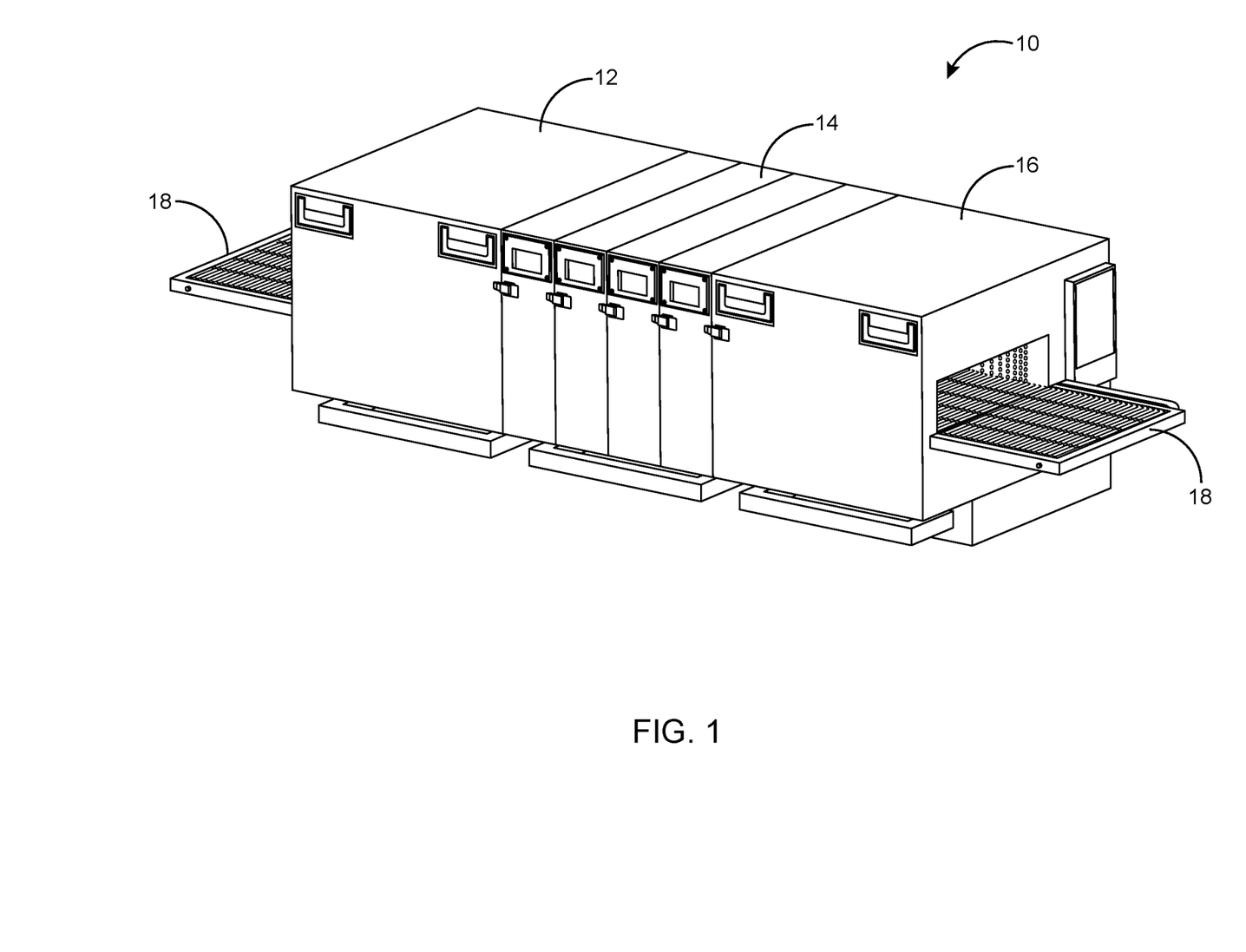
FIG. 1 is an isometric view of an oven assembly of the proposed high-speed cooking conveyor appliance utilizing both hot air impingement and microwave energy enclosing an open-ended conveyor system.

Referring to FIG. 1 is an isometric front view of a complete assembly (10) of the continuous mode conveyor cooking appliance utilizing hot air jet impingement and microwave energy for cooking prepared foods is shown. The cooking appliance comprises two hot air jet impingement ovens (12,16) on each side of a central microwave oven (14). The central microwave oven can be made up of individual microwave modules, such as the four modules (14) illustrated or can be one integrated microwave oven. A conveying system (18) that extends completely through the cooking appliance disposed within the appliance housing cooperate with each other to propel the food to be cooked, from a food insert entrance portion of the appliance housing to the food extraction exit portion of the housing. The total conveying system comprises two separate endless conveyor belts for the two hot air jet impingement ovens and a third internal endless conveyor belt for the microwave section. The two end sections conveyor belts may be constructed of stainless-steel wire and the microwave section conveyor belts may be constructed with Teflon coated fiberglass.

Figure 2:
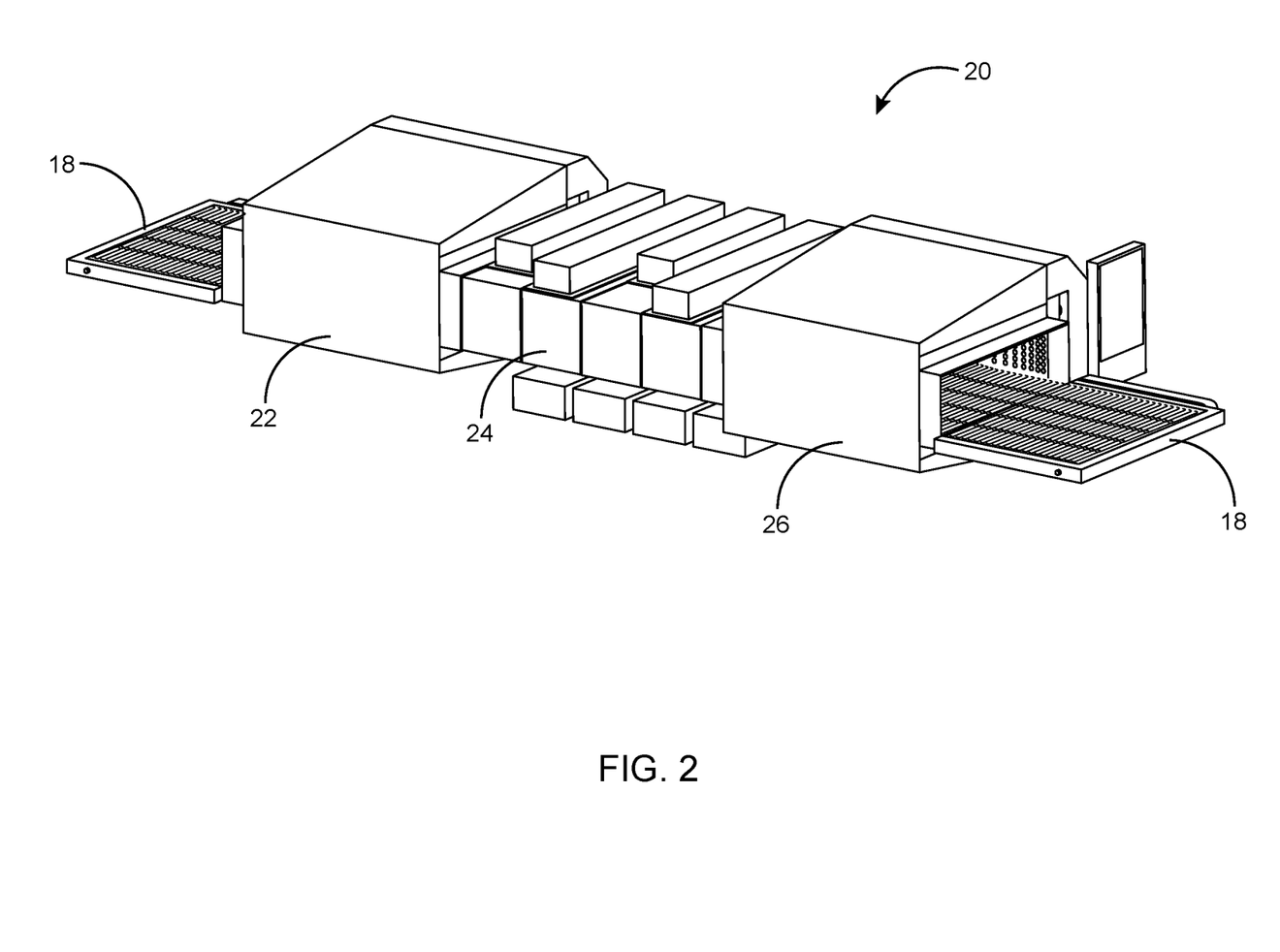
FIG. 2 is an isometric front view of the proposed high-speed cooking conveyor appliance of FIG. 1 with the outside shell and insulation removed to illustrate the microwave interior.

Referring now to FIG. 2 is an isometric front view (20) of the proposed high-speed cooking conveyor appliance of FIG. 1 with the outside shell and insulation removed to illustrate the interior. Modules (22,26) represent the hot air jet impingement ovens that are attached to either side of a central microwave oven system (24) which in this embodiment is four microwave modules connected together.

Figure 3:
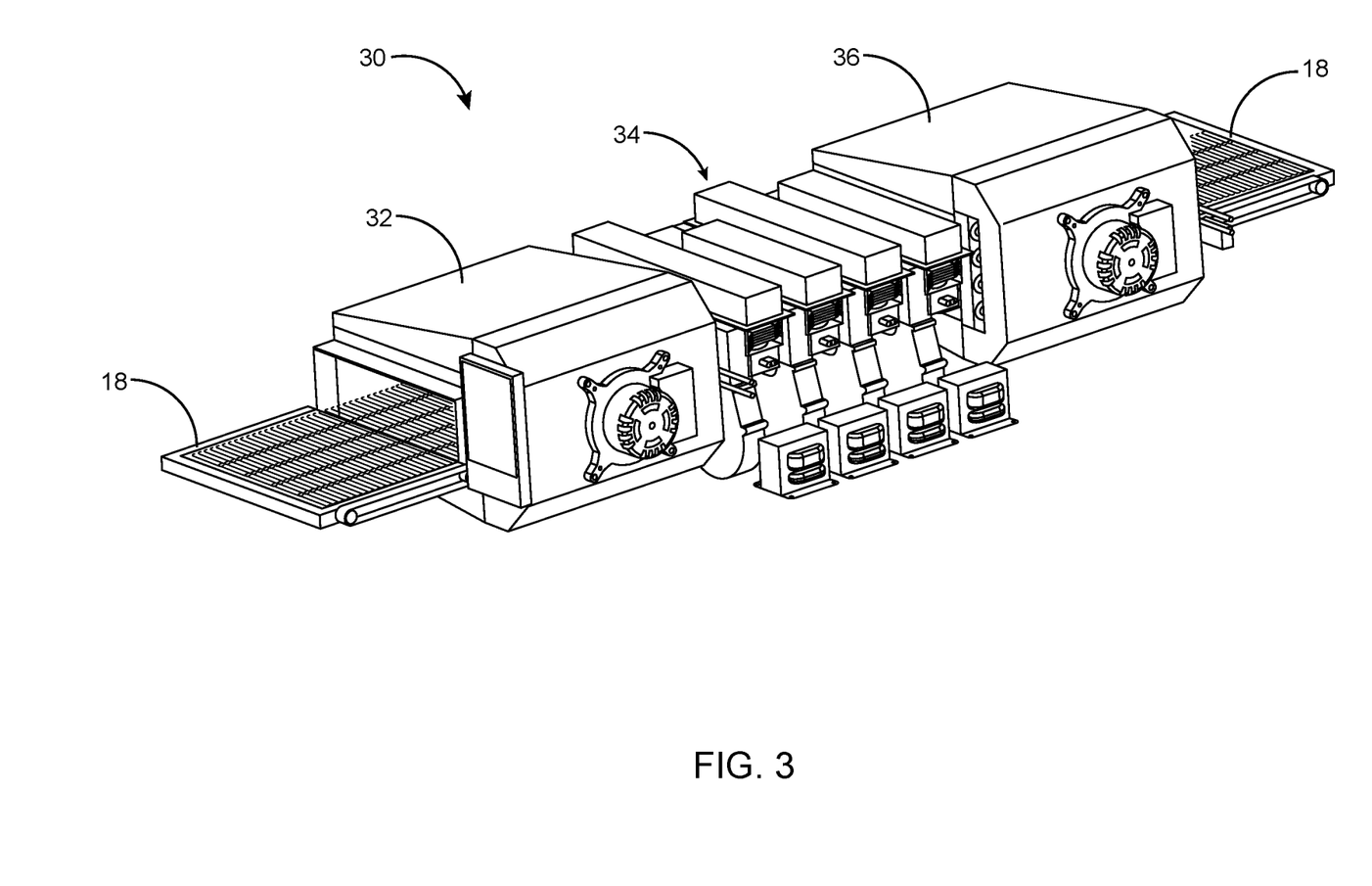
FIG. 3 is an isometric opposite view of the proposed high-speed cooking conveyor appliance of FIG. 1 with the outside shell and insulation removed to illustrate the interior.

For further understanding FIG. 3 is an isometric back view (30) of the proposed high-speed cooking conveyor appliance of FIG. 1 with the outside shell and insulation removed to illustrate the interior. Modules (32,36) represent the hot air jet impingement ovens that are attached to either side of a central microwave oven system (34) which in this embodiment is four microwave modules connected together. Again, a three part conveying system (18) that extends completely through the cooking appliance utilizing three separate conveyor belts disposed within the appliance housing that cooperate with each other to propel the food to be cooked, from a food insert entrance portion of the appliance housing to the food extraction exit portion of the housing. Each of the three conveyor belts has its own drive motor and are synced to run at the same rate.

Figure 4:
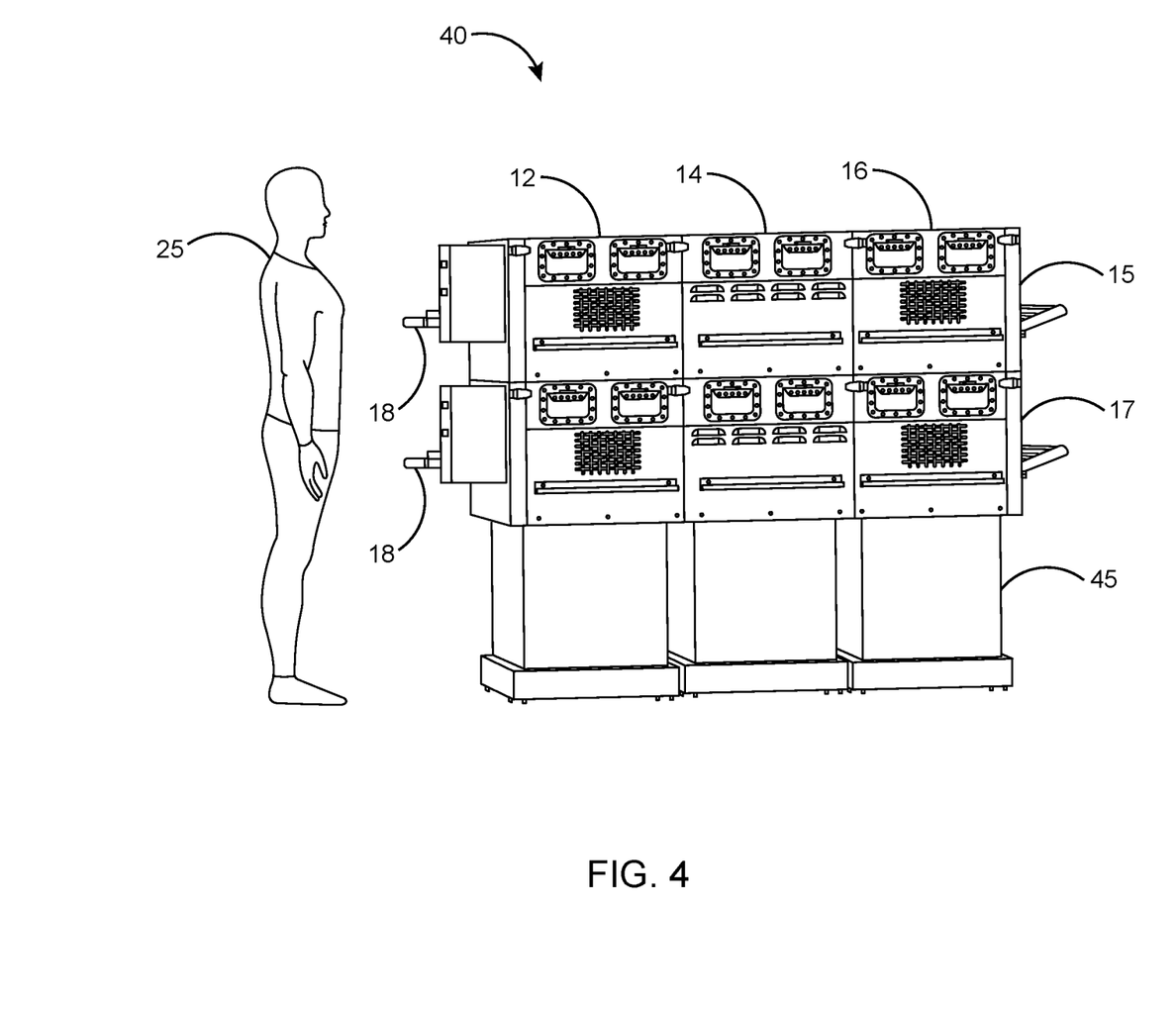
FIG. 4 illustrates a 2-high complete stacked oven assembly of the proposed high-speed cooking conveyor appliance utilizing both hot air impingement and microwave energy in an open-ended conveyor system. The human figure represents a 5 ft., 8-inch male for scale reference.

Referring now to FIG. 4 a complete assembly (40) of the continuous mode conveyor cooking appliance utilizing hot air jet impingement and microwave energy for cooking prepared foods is shown in a stacked configuration with an upper cooking appliance (15) stacked on top of a lower (17) cooking appliance. A human FIG. 25) is shown as a scale reference to illustrate the size of a 5 ft. 8-inch male. The stacking feature is important in saving floor space in a field kitchen. Each of the stacked cooking appliances (15,17) are made up of two hot air impingement ovens (12,16) on each side of a central microwave oven (14). The stacked configurations are mounted on a base (45). Both the upper cooking appliance (15) and the lower cooking appliance (17) feature conveyors (18) that function to carry the food portions completely through cooking appliances (15,20) as described earlier. This approach can also be stacked three high for some applications. That will be illustrated later in this disclosure.

Figure 5A:
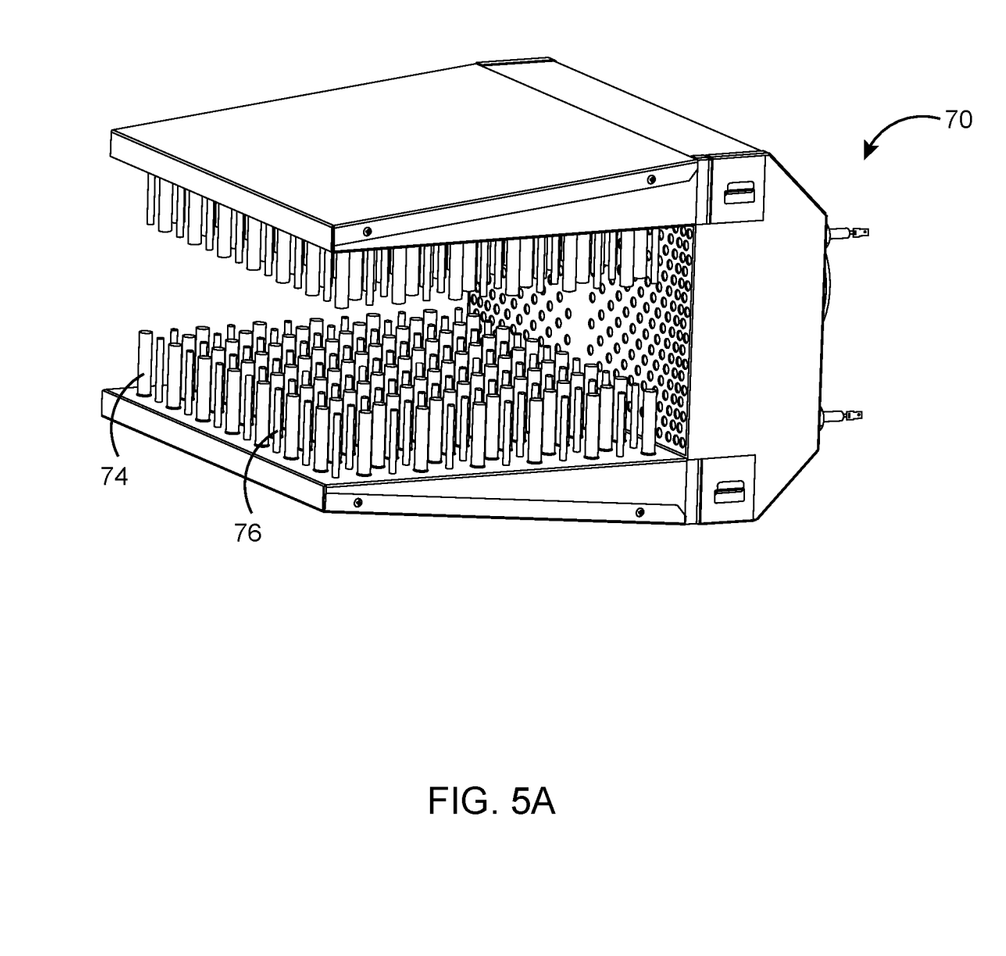
FIG. 5A represents an isometric view of the oven chamber 26 of FIG. 2 with the walls removed and the conveyor belt not shown to expose the interior of the jet impingement cooking chamber and shows the upward and downward directed impingement air jets (larger tubes) along with the solid smaller solid pins used to ensure microwave attenuation.

Turning now to FIG. 5A is an isometric view (70) of the hot air jet impingement sections oven chamber of FIG. 1 with the walls removed and the conveyor not shown to expose the interior of the jet impingement cooking chamber and shows the upward and downward directed impingement air jets (74) (larger tubes) along with the solid smaller solid pins (76) used to ensure microwave attenuation.

Each jet impingement section has conductive posts suspended in rows and columns from the top and bottom walls of the choke tunnel inside the jet impingement section. This provides an effective and substantially isotropic choke for microwave energy. The length and spacing of the posts are specific to suppress microwave leakage. The tubes are used to direct the jet impingement hot air, and in conjunction with the smaller solid pins act as the choke mechanism to suppress microwave leakage from the appliance.

Figure 5B:
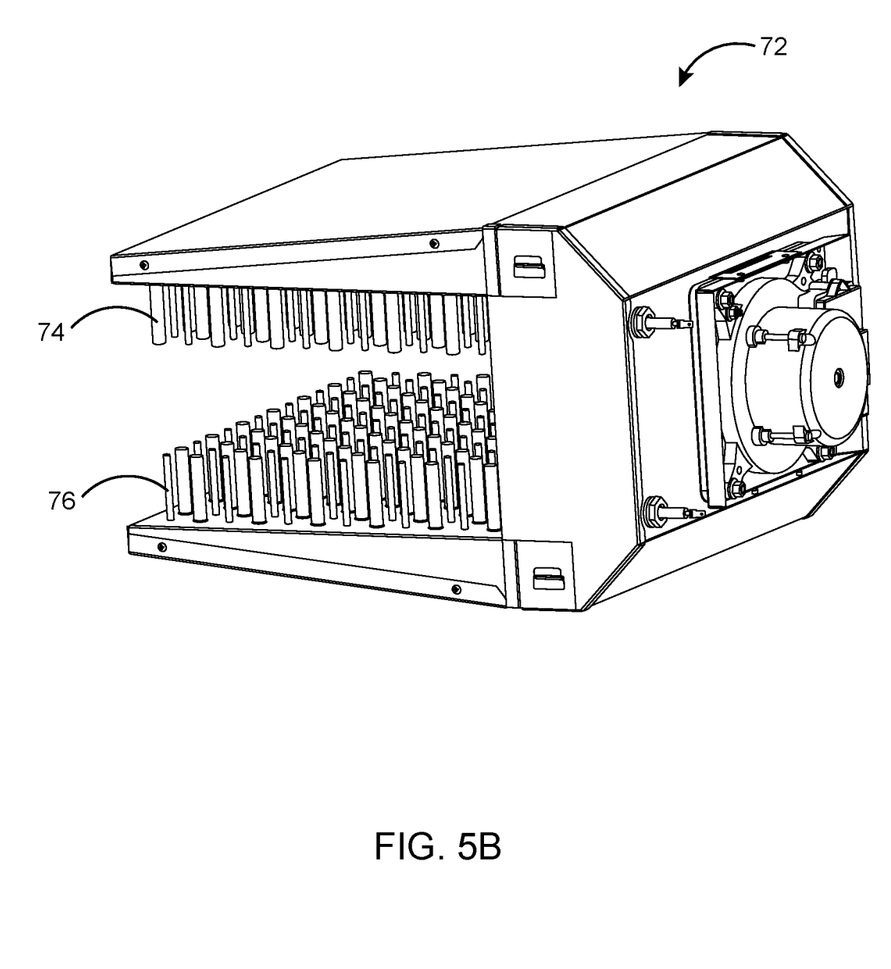
FIG. 5B represents an isometric back view of the oven chamber 26 of FIG. 2 with the walls removed and the conveyor belt not shown to expose the interior of the jet impingement cooking chamber and shows the upward and downward directed impingement air jets (larger tubes) along with the solid smaller solid pins used to ensure microwave attenuation.

FIG. 5B illustrates another isometric view (72), this time showing the backside of the same hot air jet impingement sections oven chamber of FIG. 5A.

Figure 6A:
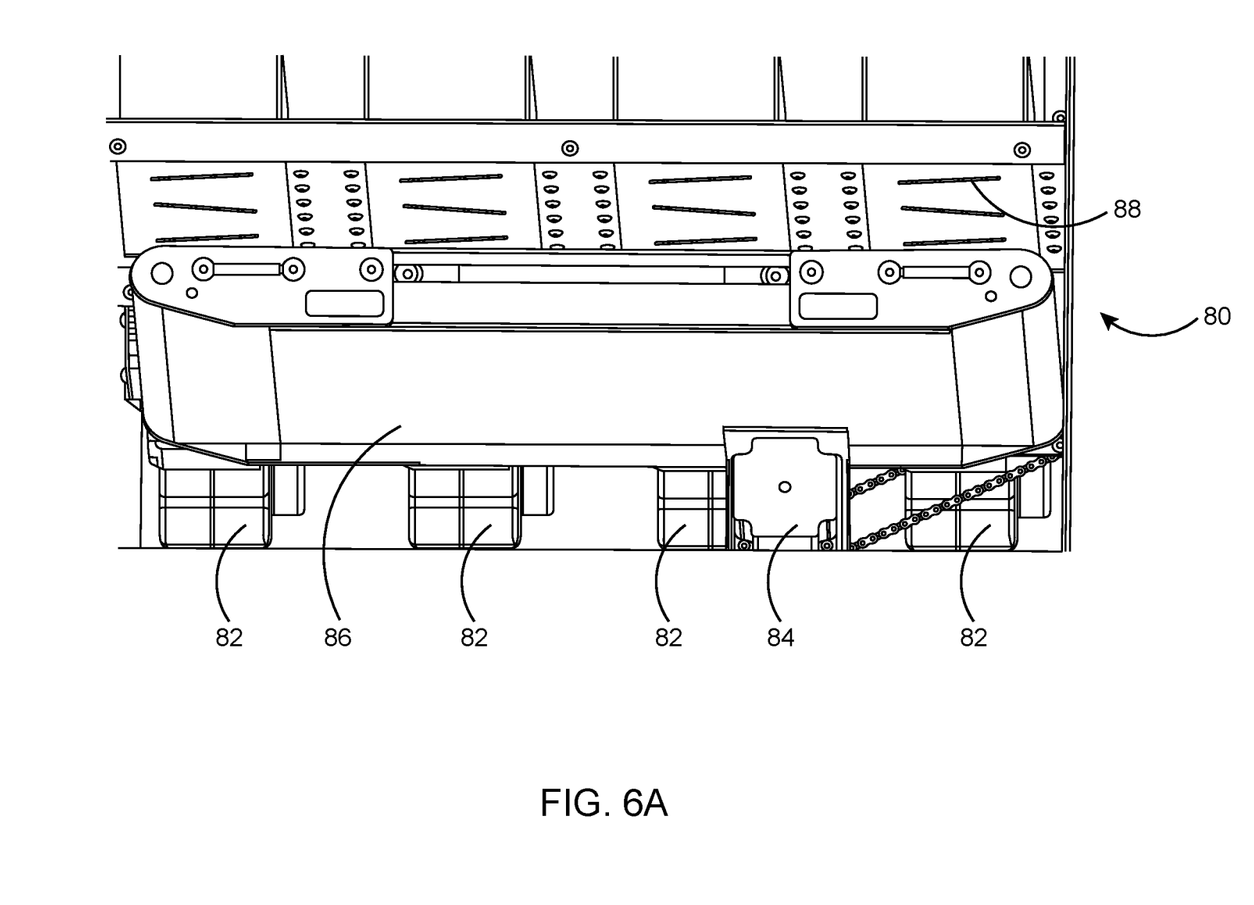
FIG. 6A illustrates an angled up upper view of the microwave section of proposed high-speed cooking conveyor appliance view of the center microwave section internal assembly showing 4 microwave wave guide boxes, and belt conveyer system.
Figure 6B:
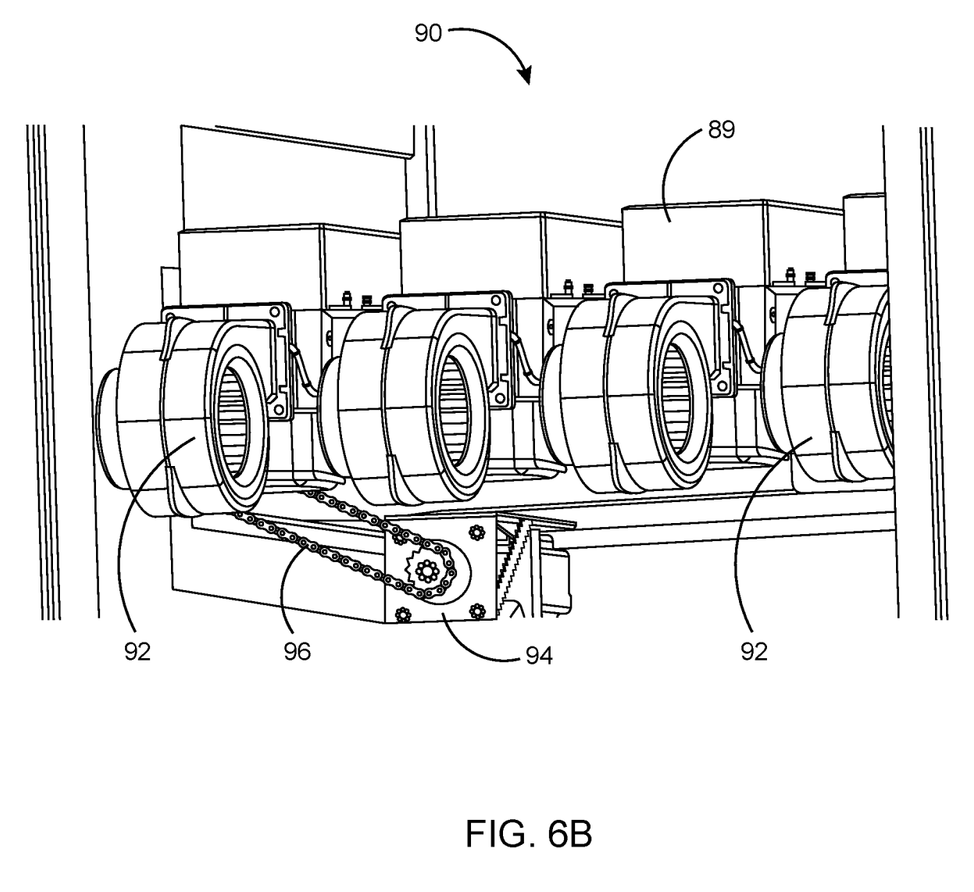
FIG. 6B illustrates a lower view back view of the internal microwave layout and structure showing four magnetron cooling blowers as well as the microwave section conveyor drive motor.

Turning now to FIGS. 6A and 6B, shown generally as 80 and 90 represent two views of the microwave section of the proposed high-speed cooking conveyor appliance. The 6A view (80) is a front angled up view, and the 6B view (90) a back view of the internal microwave layout and structure. (86) is the conveyor assembly of the microwave. This embodiment makes use of four magnetron units. There are four magnetron cooling fans (82/92) as well as a conveyor drive motor (84/94). The conveyor drive chain is shown as (96). The microwave section in this embodiment has four magnetrons (89) with staggered waveguides (88) to produce even heating. There are two magnetron blowers with ducts to cool two magnetrons each. The air intake passes over the transformer to cool them as well. On the jet impingement sides the air intake is covered by a catalytic converter (not shown) to eliminate the need for a vent hood. The heating coil (not shown) is placed behind the catalytic converter. Although this embodiment makes use of 4 magnetrons. The microwave section can be designed to work with one larger magnetron.

Figure 7:
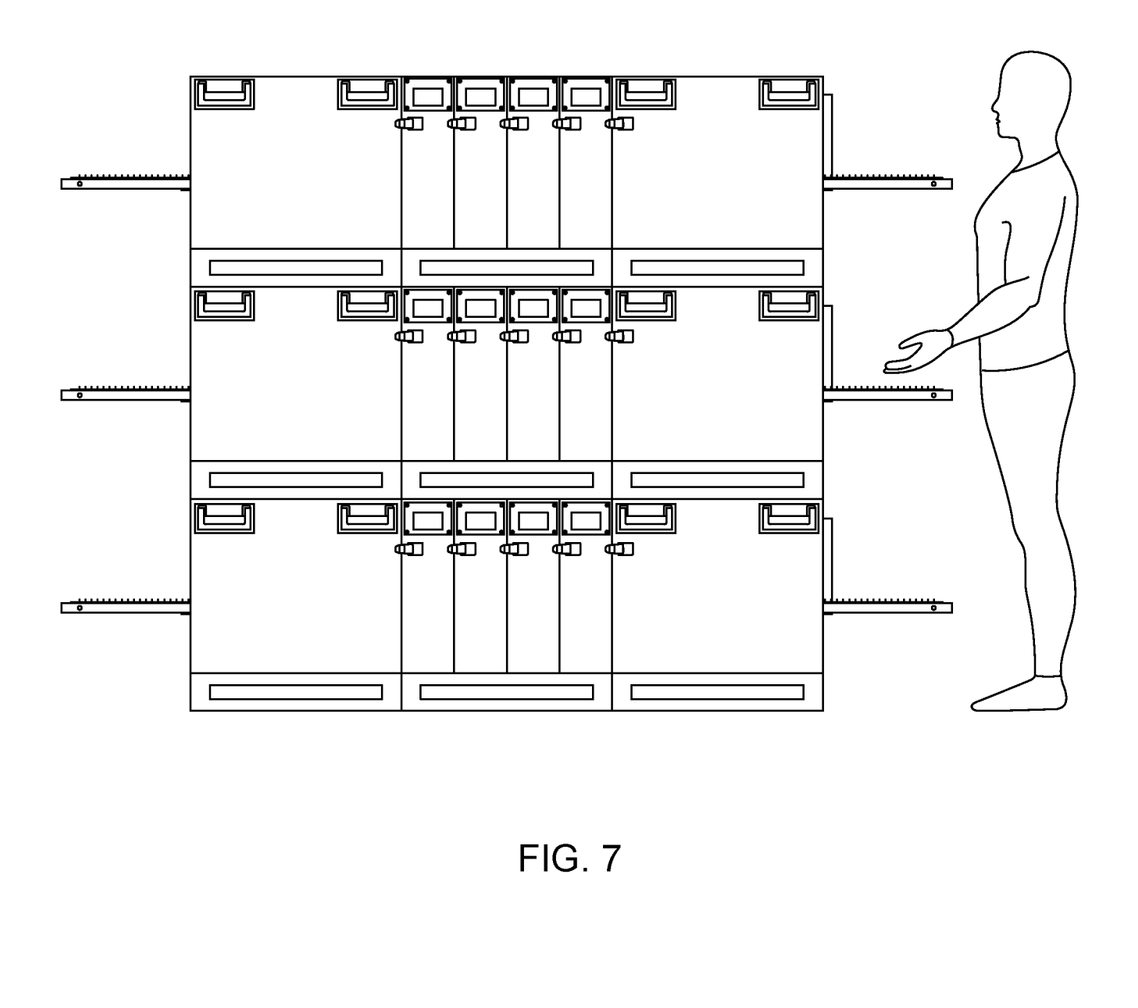
FIG. 7 illustrates an alternate embodiment of the application of this technology in which three of the oven assemblies of FIG. 1 are stacked to create a higher throughput.

Referring now to FIG. 7 we illustrate another configuration that involves the stacking of 3 of the cooking appliances described in this disclosure. This capability provides both higher throughput of cooked food but also flexibility in that each of the stacked appliances can be programmed to operate with parameters (temperatures, conveyor speed, air jet velocities, and microwave powers specific to certain food groups.

Figure 8:
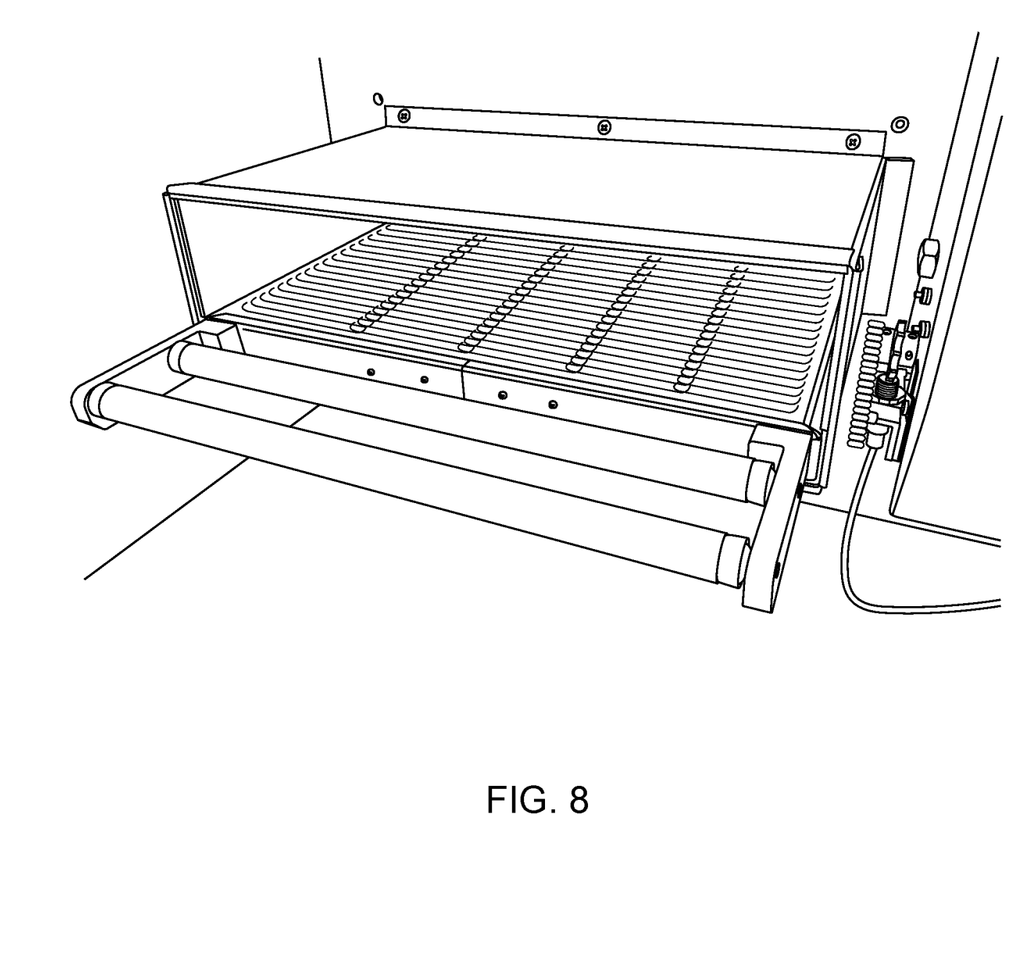
FIG. 8 illustrates an added infeed tunnel to the entry end of the proposed high-speed cooking conveyor appliance that provides further limitation of the potential microwave spikes escaping from the cooking conveyor appliance.
Figure 9:
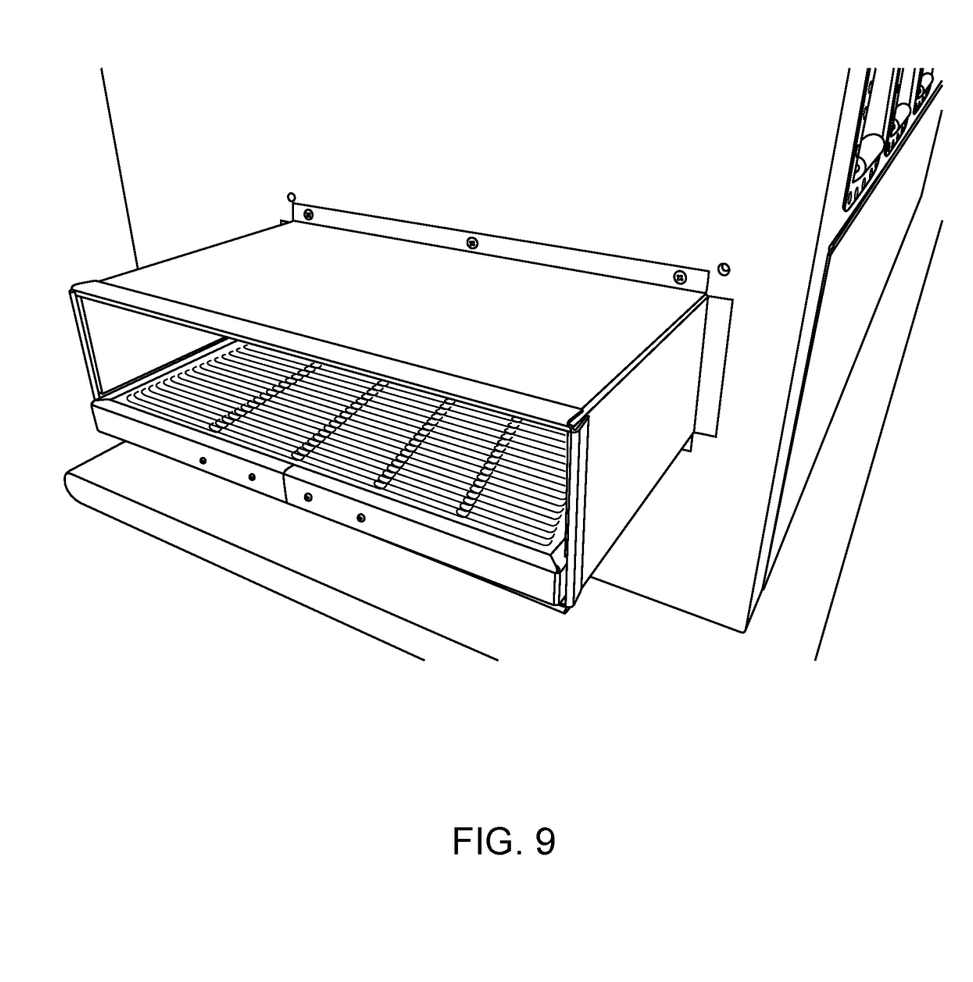
FIG. 9 illustrates an added outfeed tunnel to the output end of the proposed high-speed cooking conveyor appliance that provides further limitation of the potential microwave spikes escaping from the cooking conveyor appliance.

And referring to FIGS. 8 and 9 two extended tunnels are shown that can be added to the infeed and outfeed portions of the continuous mode conveyor cooking appliance to provide further limitation of potential microwave spikes escaping from the cooking conveyor appliance.

Microwave Attenuation

Microwave energy is extensively used in many industrial, scientific and medical applications, which frequently require the participation of human beings in direct contact with microwave equipment. Specifically, industrial microwave ovens often employ open-ended waveguide ports in order to allow a continuous flow of the material to be processed. For this reason, safety issues become a main concern in such systems to prevent possible dangerous effects on human tissues due to microwave energy leakage.

Some alternatives to deal with this leakage problem have been proposed in technical literature. One of the most effective choices is based on corrugated reactive filters which reflect back the energy escaping from the applicator. But some limitations have been found in this work for those traditional structures, particularly regarding the dielectric properties of the processed material.

The present disclosure addresses the goal of improving these reactive filters when the oven requires a continuous-flow of the material to be processed. In order to do that, new structures are proposed which solve the inconveniences that traditional filters show, along with the use of optimization algorithms that reduce the design time.

In the three-chamber design the two jet impingement chambers on either side of the microwave chamber will also function as attenuation chambers. To achieve good jet impingement velocities as well as good microwave attenuation in each of the end chambers a combination of impingement jets carrying heated air to the food as well as solid pins interspersed with the heated air impingement jets is used. This combination using specific length and spacing of all the tubes has been shown to properly attenuate the microwaves from escaping the two end chambers. Each of the two jet impingement chambers function to provide a combination of air jet impingement and microwave attention in one chamber. In addition, an added limitation of escaping microwave spikes can be provided by the addition of infeed and outfeed tunnels to each end of the continuous mode conveyor cooking appliance utilizing hot air jet impingement and microwave energy extend the distance of the entry and exit points from the microwave sources.

What we claim is:

1. A continuous mode conveyor cooking appliance utilizing hot air jet impingement and microwave energy for cooking prepared foods, comprising:
   a. one or more housings, each comprising a central microwave section, and a first end portion and a second end portion on either side of the microwave section;
   b. a food insert entrance portion defined within the first end portion of each housing for inputting food, to be cooked, into each housing;
   c. a food extraction exit portion defined within the second end portion of each housing for extracting food, that has been cooked, out from each housing;
   d. three endless conveyor belts disposed within each housing and cooperating with each other for propelling the food, to be cooked, from the food insert entrance portion of each housing, through the central microwave section of each housing, to the food extraction exit portion of each housing;
   e. wherein each first end portion and second end portion comprise upward and downward directed impingement air jet tubes for heating and upward and downward directed solid pins, all of the same length, the combination of which is configured to function as a microwave energy attenuation system to control microwave energy leakage from each first end portion and second end portion.

2. The continuous mode conveyor cooking appliance utilizing hot air jet impingement and microwave energy for cooking prepared foods of claim 1, wherein each housing is stacked vertically to minimize floor space needs during operation.

3. The continuous mode conveyor cooking appliance utilizing hot air jet impingement and microwave energy for cooking prepared foods of claim 1, wherein each central microwave section comprises four magnetrons with staggered waveguides to produce even heating.

4. The continuous mode conveyor cooking appliance utilizing hot air jet impingement and microwave energy for cooking prepared foods of claim 1, wherein each central microwave section comprises one magnetron with staggered waveguides.

5. A method for continuously cooking prepared foods using a conveyor system utilizing hot air jet impingement and microwave energy comprising:
   a. providing one or more housings, each comprising a central microwave section, and a first end portion and a second end portion on either side of the microwave section;
   b. providing a food insert entrance portion defined within the first end portion of each housing for inputting food, to be cooked, into each housing;
   c. providing a food extraction exit portion defined within the second end portion of each housing for extracting food, that has been cooked, out from each housing;
   d. providing three endless conveyor belts disposed within each housing and cooperating with each other for propelling the food, to be cooked, from the food insert entrance portion of each housing, through the central microwave section of each housing, to the food extraction exit portion of each housing;
   e. providing, in each first end portion and second end portion, upward and downward directed impingement air jet tubes for heating and upward and downward directed solid pins, all of the same length, the combination of which is configured to function as a microwave energy attenuation system to control microwave energy leakage from each first end portion and second end portion.

6. The method for continuously cooking prepared foods using a conveyor system utilizing hot air jet impingement and microwave energy of claim 5, further comprising providing multiple stacked and connected housings.

7. The method for continuously cooking prepared foods using a conveyor system utilizing hot air jet impingement and microwave energy of claim 5, further comprising providing four magnetrons with staggered waveguides within the central microwave section.

8. The method for continuously cooking prepared foods using a conveyor system utilizing hot air jet impingement and microwave energy of claim 5, further comprising providing one magnetron with staggered waveguides in the central microwave section.

* * * * *

UNITED STATES PATENT AND TRADEMARK OFFICE
CERTIFICATE OF CORRECTION

PATENT NO. : 12,016,107 B2
APPLICATION NO. : 17/207532
DATED : June 18, 2024
INVENTOR(S) : Michael Jay Dobie et al.

It is certified that error appears in the above-identified patent and that said Letters Patent is hereby corrected as shown below:

In the Specification

1. In Column 1, Line 41, delete "Ail" and insert -- All --, therefor.
2. In Column 1, Line 41, delete "fora" and insert -- for a --, therefor.
3. In Column 5, Line 32, delete "25)" and insert -- (25) --, therefor.

Signed and Sealed this
Thirteenth Day of August, 2024

Katherine Kelly Vidal
*Director of the United States Patent and Trademark Office*